US008159331B2

(12) United States Patent
Stagg (10) Patent No.: US 8,159,331 B2
(45) Date of Patent: Apr. 17, 2012

(54) METHOD AND SYSTEM FOR RADIATED POWER CONTROL FOR SHORT RANGE RFID TAG READING

(75) Inventor: Adrian Joseph Stagg, Etobicoke (CA)

(73) Assignee: Psion Teklogix Inc. (CA)

( * ) Notice: Subject to any disclaimer, the term of this patent is extended or adjusted under 35 U.S.C. 154(b) by 986 days.

(21) Appl. No.: 11/779,129

(22) Filed: Jul. 17, 2007

(65) Prior Publication Data

US 2009/0021374 A1 Jan. 22, 2009

(51) Int. Cl.
 *H04Q 5/22* (2006.01)
 *G08C 19/12* (2006.01)
 *G08B 13/14* (2006.01)
(52) U.S. Cl. .............. 340/10.3; 340/10.5; 340/13.26; 340/572.1; 340/572.4
(58) Field of Classification Search ...... 340/10.1–10.52, 340/572.1–572.9
See application file for complete search history.

(56) References Cited

U.S. PATENT DOCUMENTS

| | | | | |
|---|---|---|---|---|
| 3,553,695 A | * | 1/1971 | Simon et al. | 342/385 |
| 4,975,708 A | * | 12/1990 | Stayton | 342/374 |
| 5,574,993 A | * | 11/1996 | Kobayashi et al. | 455/126 |
| 6,483,427 B1 | * | 11/2002 | Werb | 340/10.1 |
| 6,600,418 B2 | * | 7/2003 | Sainati et al. | 340/572.1 |
| 7,167,123 B2 | | 1/2007 | Hausner et al. | |
| 2006/0214773 A1 | * | 9/2006 | Wagner et al. | 340/10.2 |
| 2007/0066224 A1 | * | 3/2007 | d'Hont et al. | 455/41.2 |
| 2007/0211820 A1 | * | 9/2007 | Hara et al. | 375/297 |
| 2008/0231449 A1 | * | 9/2008 | Moshfeghi | 340/572.1 |

FOREIGN PATENT DOCUMENTS

WO WO 03/038778 5/2003

* cited by examiner

*Primary Examiner* — Jennifer Mehmood
*Assistant Examiner* — Andrew Bee
(74) *Attorney, Agent, or Firm* — Altera Law Group, LLC (57) ABSTRACT

A method and system for power control for Radio Frequency Identification (RFID) tag reading is provided. The system includes a power amplifier for providing an RF transmit signal for the RFID tag reading. The RF transmit signal is provided to an antenna for radiating the transmit signal. The power of the radiated transmit signal defining a read range for the RFID tag reading. The system includes an attenuator provided between the power amplifier and the antenna for controlling the power of the radiated transmit signal to adjust the read range. A handheld RFID reader may include the system. The method includes calibrating the output power of a reader having a power amplifier and an attenuator provided between the power amplifier and an antenna. The step of calibrating includes at least one of controlling power of the power amplifier in its linear region, and controlling attenuation level of the attenuator.

24 Claims, 10 Drawing Sheets

METHOD AND SYSTEM FOR RADIATED POWER CONTROL FOR SHORT RANGE RFID TAG READING

FIELD OF INVENTION

The present invention relates to Radio Frequency (RF) communication technology, and more specifically to a method and system for Radio Frequency Identification (RFID) tag reading operation.

BACKGROUND OF THE INVENTION

RFID systems are used in a wide variety of applications, such as for automatic identification in the supply chain, inventory management in a warehouse and monitoring and tracking work in progress in a manufacturing environment. A typical RFID system has RFID tags, each having a unique identifier stored in the tag's memory, and an RFID reader. The RF reader emits an RF signal that is received by an RFID tag within the reader's range. The RFID tag, in turn, is powered by the RF signal which is emitted by the reader; the tag rapidly changes its reflectivity such that the signal reflected back to the reader by the tag is amplitude-modulated, and the unique identifier stored in the tag's memory can be encoded into the reflected signal and therefore be received by the reader. The RFID tag is attached to an object. By reading the unique identifier stored in the RFID tag's memory, the object can be identified, and managed or tracked.

Figure 1:
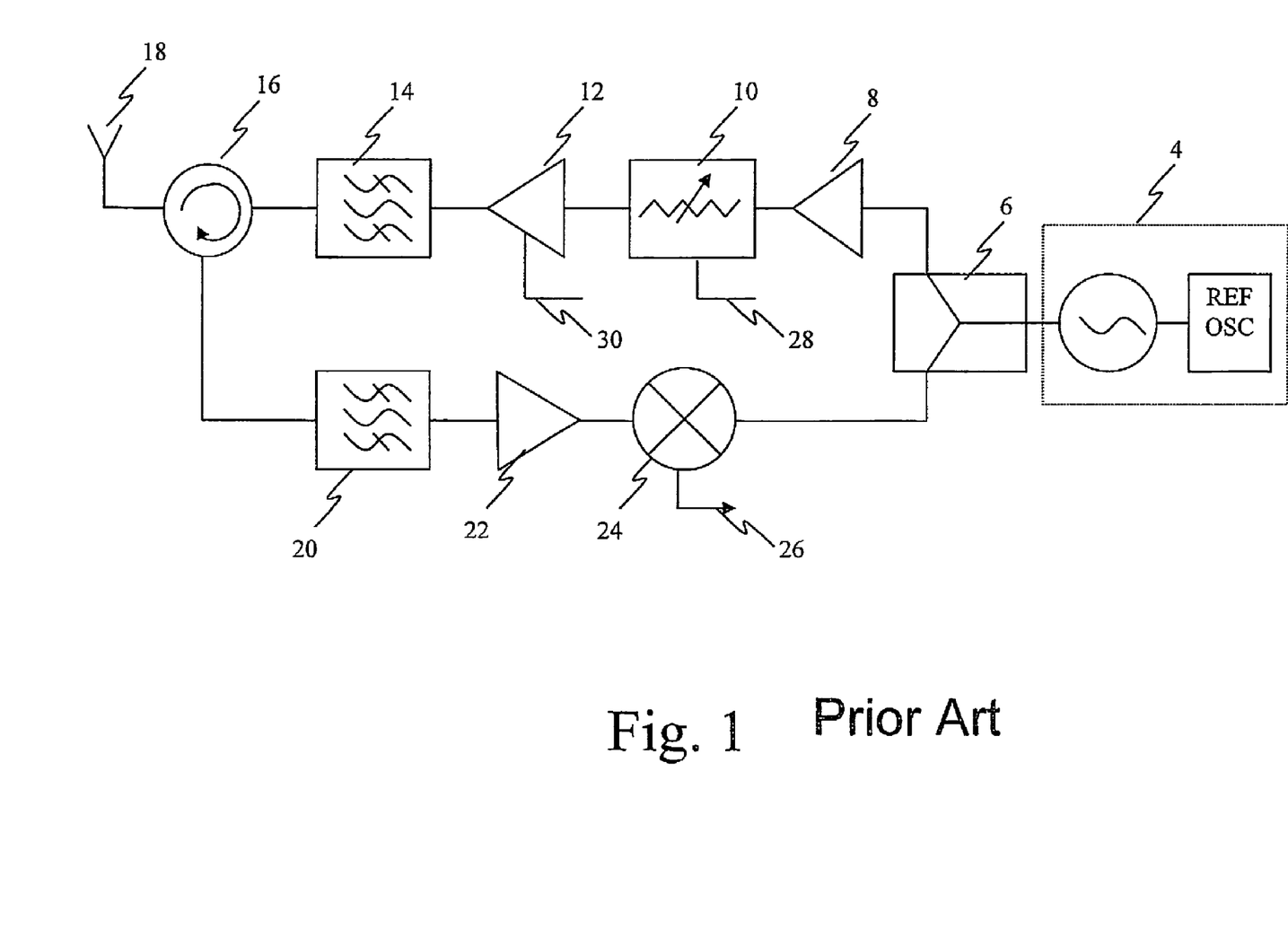
FIG. 1 is a diagram illustrating an RF architecture in a conventional UHF RFID reader.

The RFID reader includes an RF architecture for preparing a signal, amplifying the signal and radiating the signal, as shown in FIG. 1. FIG. 1 illustrates an RF architecture in a conventional Ultra High Frequency (UHF) RFID reader. Referring to FIG. 1, a continuous wave (CW) signal generated by a local oscillator 4 is split into two signal paths (i.e., transmit path and receive path) by a power splitter 6. The transmit path includes a pre-amplifier 8, a modulation attenuator 10 controlled by a control signal 28, a power amplifier 12, and a filter 14. The receive path includes a filter 20, an amplifier 22, and a mixer 24. A signal from the transmit path is provided to the antenna 18 via a circulator 16, and a signal received from the antenna 18 is provided to the receive path via the circulator 16.

The transmit signal is AM modulated (amplitude modification) using the attenuator control signal 28 to set the modulation attenuator 10 to one of two states so that information can be encoded onto the CW, when the RFID reader is required to transmit information or control signals to the tag. The modulated signal is amplified by the power amplifier 12. After the transmit signal has been filtered to remove unwanted signal components by the filter 14, the signal is fed into the circulator 16, and is radiated by the antenna 18. If an RFID tag is within the read range, said tag will respond to the RFID reader's modulated signal radiated from the antenna 18, and at the appropriate time modulate its response onto the unmodulated carrier (CW) signal transmitted by the RFID reader.

The circulator 16 directs a signal received from the antenna 18 to the filter 20 which removes unwanted signal components. The resulting signal is amplified by the amplifier 22, before being mixed at the mixer 24 with the CW generated by the local oscillator 4, to remove the carrier leaving only the information modulated onto the CW by the tag. The output 26 of the mixer 24 is sent to be demodulated.

The overall amplitude of the transmitted signal, and therefore the read range of the RFID reader is controlled by the power amplifier control 30. RF power amplifiers generally only provide linear amplitude control over a portion of their dynamic range (the linear region), and the resolution of control possible is limited at lower levels of amplification. Therefore the lowest output power of the radiated signal is usually at the lower end of the amplifiers linear region.

Figure 2:
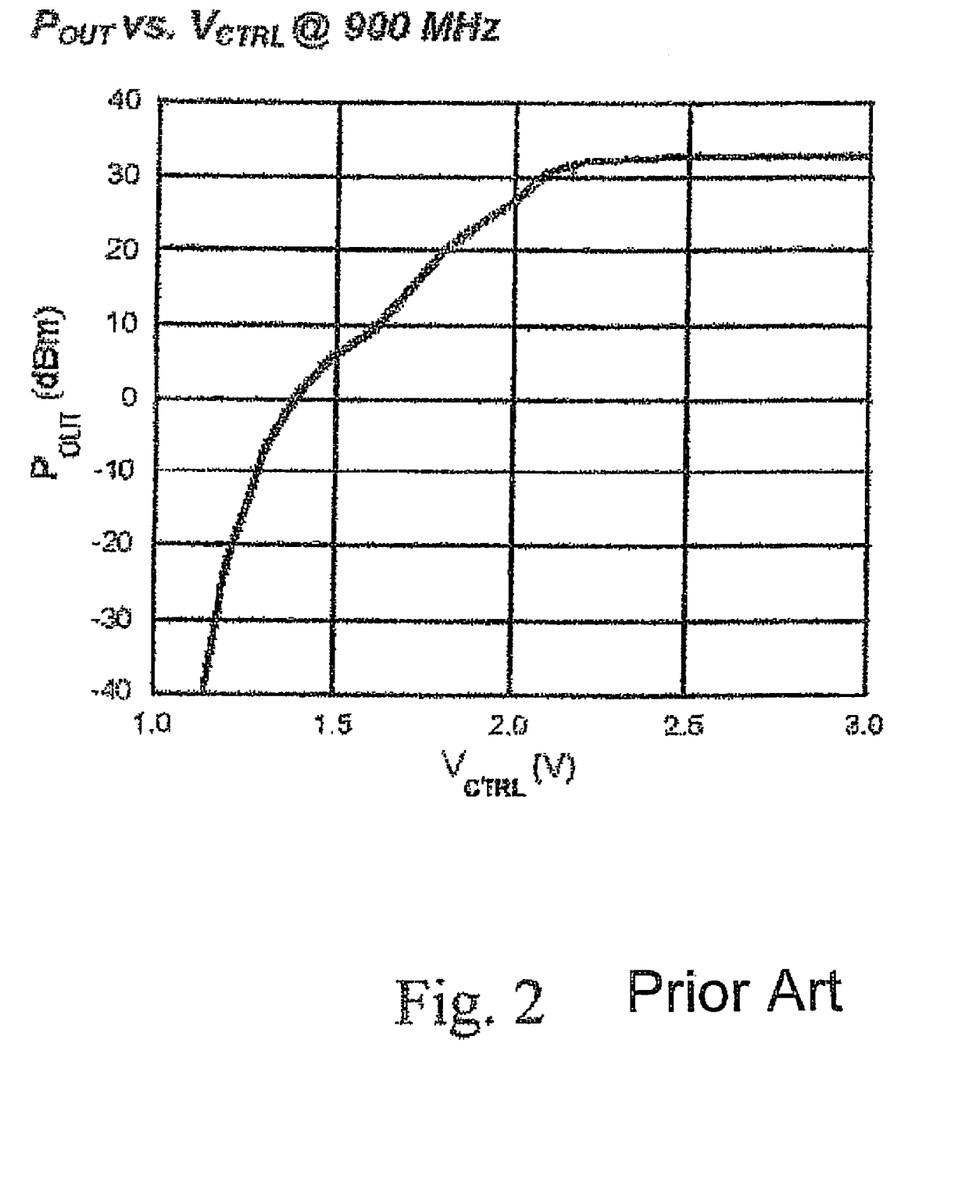
FIG. 2 is a graph illustrating a typical curve for power output vs power amplifier control signal in a power amplifier employed in FIG. 1.

FIG. 2 illustrates a typical curve for power output vs power amplifier control signal voltage for a UHF RF power amplifier (Reference: M/ACOM MAAPSS0095 datasheet). The output power is largely linear in the region when the control voltage is between 1.7V and 2.2 V, and this is the linear region of the power amplifier. The curve becomes steep below 1.5V and precise control is therefore not possible, which limits the minimum output power of the RFID reader to the lowest point of the linear region, if accurate control of the output power is to be retained.

As described above, the read range of a UHF RFID reader is usually controlled by reducing the amount of amplification provided by a power amplifier (e.g., using control voltage 30 to control amount of amplification provided by amplifier 12 of FIG. 1) in the transmit path of the RFID reader. The minimum read range is usually defined by the point at which the power output of the amplifier can no longer be linearly controlled, leading to a minimum read range which is greater than that required to scan a single tag when it is surrounded by other tags.

Accordingly, when accurately reading a tag of interest among a plurality of tags, it is necessary to use a costly and elaborate power amplifier which can retain a linear response over a wide dynamic range or to use an inexpensive power amplifier, and perform time consuming calibration of a non-linear region of the power amplifier.

SUMMARY OF THE INVENTION

It is an object of the invention to provide a method and system that obviates or mitigates at least one of the disadvantages of existing systems.

In accordance with an aspect of the present invention there is provided a system for power control for Radio Frequency Identification (RFID) tag reading. The system includes a power amplifier for providing an RF transmit signal for the REID tag reading The RF transmit signal is provided to an antenna for radiating the transmit signal. The power of the radiated transmit signal defining a read range for the RFID tag reading. The system includes an attenuator provided between the power amplifier and the antenna for controlling the power of the radiated transmit signal to adjust the read range.

In accordance with another aspect of the present invention there is provided a handheld RFID reader. The reader includes an antenna, the power control system described above and connected to the antenna, a host communicating with the power control system for the RFID tag reading, and a housing for the handheld RFID reader.

In accordance with a further aspect of the present invention there is provided a method for power control for Radio Frequency Identification (RFID) tag reading. The method includes calibrating the output power of a reader. The reader includes a power amplifier for providing an RF transmit signal for the RFID tag reading, an antenna for radiating the transmit signal and an attenuator provided between the power amplifier and the antenna. The output power of the reader defining a read range for the RFID tag reading. The step of calibrating includes at least one of controlling power of the power amplifier in its linear region, and controlling attenuation level of the attenuator.

BRIEF DESCRIPTION OF THE DRAWINGS

These and other features of the invention will become more apparent from the following description in which reference is made to the appended drawings wherein.

DETAILED DESCRIPTION

Embodiments of the present invention are described using a handheld RFID reader in which the effective radiated power of the RFID reader is reduced such that a single RFID tag of interest can be read, without reading other tags that are in close proximity to the tag of interest.

It will be appreciated by one of ordinary skill in the art that the RFID reader may have functionality of tag write operation in addition to the tag read operation. The handheld RFID reader may be, but not limited to, a UHF reader or a High Frequency (HF) RFID. In the description, "a (the) tag of interest" and "a (the) target tag" may be used interchangeably. In the description, "user" and "operator" may be used interchangeably.

Figure 3:
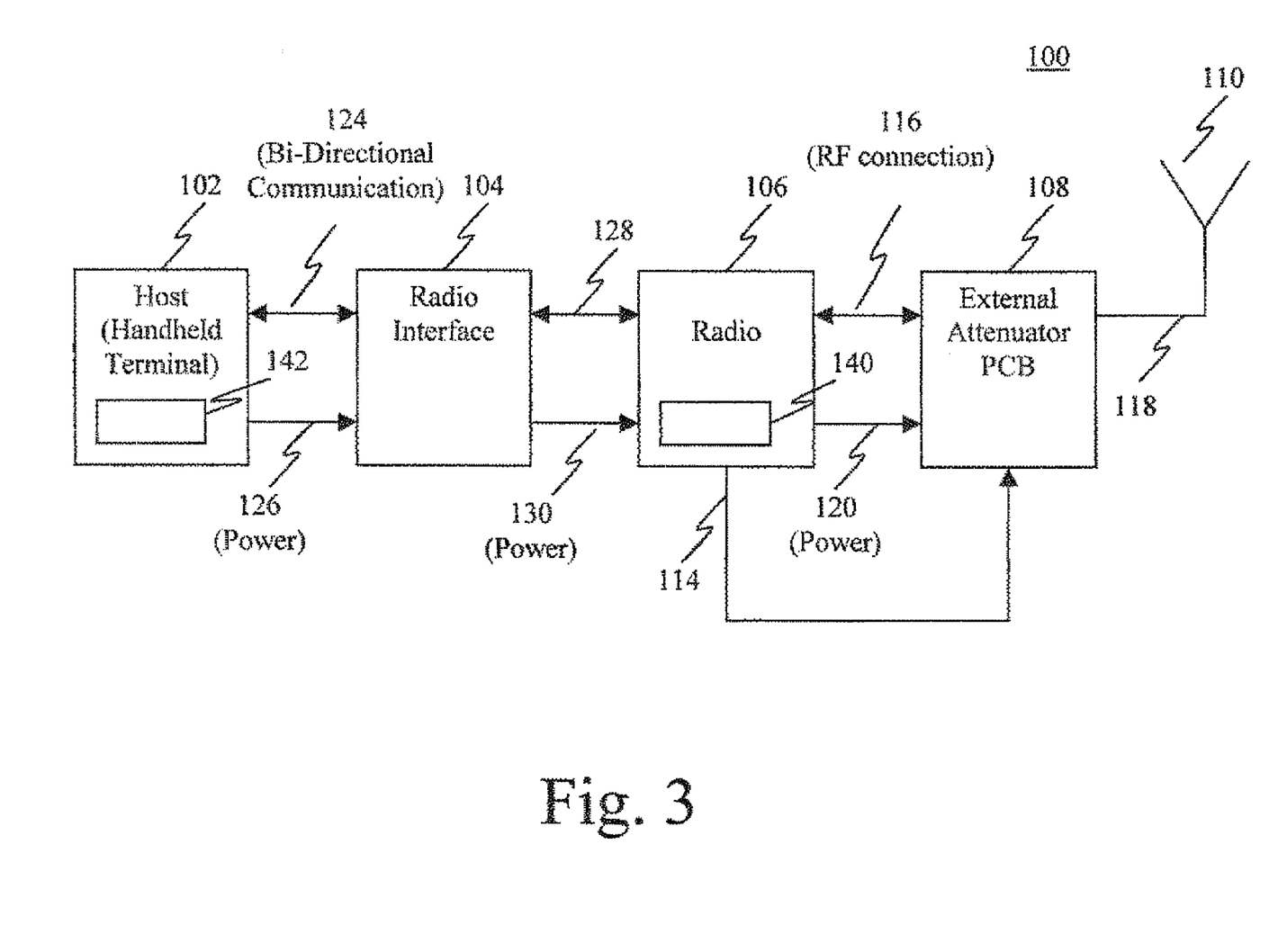
FIG. 3 is a diagram illustrating an RFID reader system in accordance with an embodiment of the present invention.

FIG. 3 illustrates an REID reader system in accordance with an embodiment of the present invention. The RFID reader system 100 of FIG. 3 includes a host (handheld terminal) 102 for RFID tag reading operation and an RF architecture for RF communications with RFID tags. The RF architecture includes a radio interface 104, a radio 106, an external attenuator board (PCB: Printed Circuit Board) 108 having an attenuator, and an antenna 110.

In the description, the terms "(external) attenuator board (PCB) 108", "attenuator 108" and "switchable (external) attenuator 108" may be used interchangeably. In the description, the terms "radio" and "radio module" may be used interchangeably. In the description, the terms "host handheld terminal" and "host" may be used interchangeably.

In FIG. 3, the elements 104, 106, 108, and 110 are illustrated separately from the host 102. However, these elements or part of them may be in the host 102 or be integrated into the host 102. In FIG. 3, the attenuator board 108 is "external" to the radio 106. In this case, the radio 106 may be, but not limited to, an off the shelf module. However, the attenuator 108 does not have to be external to the radio 106. The attenuator 108 may be added as part of the radio 106.

In FIG. 3, "116" represents an RF connection (link/path) to the attenuator PCB 108; "120" represents power provided by the radio 106 to the attenuator PCB 108; "124" represents a bi-directional communication (link/path) between the host 102 and the radio interface 104; "126" represents power provided by the host 102 to the radio interface 104; "128" represents a bi-directional communication (link/path) between the radio interface 104 and the radio 106; "130" represents power provided by the radio interface 104 to the radio 106.

RFID tags are activated when they are within a certain proximity to the RFID reader system 100. The RFID tags receive RF signals transmitted from the antenna 110 and are powered by, and respond to commands amplitude modulated onto the RF signal by the reader. The activated RFID tags reply back to the RFID reader system 100. The activated RFID tags reflect un-modulated RF signals generated by the reader, and modulate data onto the reader's un-modulated signal by changing their reflectivity co-efficient so that the reader receives back it's own signal which has been amplitude modulated by the tag to encode the data stored on the tag. (e.g., a signal having an identifier). The RFID reader system 100 communicates with a server (not shown) depending on the application. As it could be appreciated by one of ordinary skill in the art that the reader 100 can identify multiple tags more or less simultaneously. As it could be appreciated by one of ordinary skill in the art that the reader 100 can read a tag when the tag is obstructed, as long as the RF signal can reach the tag.

A tag of interest is selected by positioning the antenna 110 of the handheld RFID reader 100. As described below, the reader 100 reads the tag of interest, which is positioned directly in front of the antenna 110. The system 100 effectively adjusts radiated power of the RFID reader, using the attenuator 108, so that the reader 100 does not read the other tags surrounding that particular tag of interest.

The host handheld terminal 102 includes a data processing and control portion (e.g., processor, controller) for controlling tag read operation including the operation of the RF architecture. The host 102 may include a data processing and control potion for tag write operation. The host handheld terminal 102 includes user interface which communicates with the data processing and control portion. The user interface may include, for example, but not limited to, a trigger (e.g., 252 of FIGS. 5-6), and the data processing and control portion may include a trigger control for the trigger. The host 102 may include a display having, for example, a touch screen (e.g., 258 of FIGS. 5-6).

The host handheld terminal 102 includes a power source (not shown) and provides power 126 to the radio 106 via the interface board 104, which ensures that the power to the radio 106 is well regulated by the use of a regulator 142. The regulator 142 may be, for example, but not limited to, a step-up switch mode regulator, a linear regulator, or a step-up/step-down regulator. The radio interface board 104 converts communication signals from the host 102 via the bi-directional communication link 124 to voltages which are compatible with the radio 106. The host 102 receives data (e.g., reply from tags) through the communication link 124 from the radio 106.

Communications on the link 124 may be, but not limited to, serial communications at RS232 levels with Transmit (TX), Receive (RX), CTS (Clear to send) and RTS (Request to Send) signals; serial communications at RS232 levels with only Transmit and Receive signals; serial Communications at low voltage (5V, 3.3V, 2.5V or 1.5V) with TX, RX, CTS and RTS signals; serial communications at low voltage with only TX and TX, USB (Low speed, full speed or high speed), USB on-the-go; Firewire (IEEE 1394); or I2C.

The attenuator 108 is provided between the RF port of the radio 106 and the antenna 110. The attenuator 108 is connected to the radio 106, powered (116) and controlled (114) by signals from the radio 106, therefore eliminating any possible sources of noise which may degrade the RF signal. The filtering of external power and control signals to/from the radio 106 are carried forward to the attenuator 108. In another example, the attenuator 108 may be powered and controlled by signals received from the handheld terminal which are not routed through the radio 106. Excess RF power is absorbed and radiated as heat by the attenuator board 108, therefore providing precise control of the actual radiated power.

The attenuator 108 is switchable for switching its attenuation level. The attenuator 108 may have "on" and "off". The attenuator 108 may have "on", "off", and different levels of attenuation when it is in "on" mode. The operation mode of the attenuator 108 (i.e., attenuation "on", attenuation "off" different levels of attenuation) is selected by, for example, one or more digital output signals 114 from the radio 106.

The effective field of view of the RFID reader encompasses a large area and all RFID tags in this field of view are read more or less simultaneously by disabling the attenuator 108 ("off"), or selecting a low level of attenuation. The effective field of view of the RFID reader is reduced by enabling the attenuator 108 ("on") or selecting a high level of attenuation such that an RFID tag of interest can be physically singulated from the other RFID tags, even when the other RFID tags surround the RFID tag that is of interest to the operator of the handheld RFID reader.

The radio 106 includes a power amplifier (e.g., 158 of FIG. 4) for providing a transmit signal that is radiated from the antenna 110. The reader 100 controls the power setting of the power amplifier in the radio 106. The power amplifier may be operated directly or indirectly by the host 102.

It is desirable to operate amplifiers and other devices in their linear region, because only by operating them in their linear region it is possible to predict the operation of such devices. Semiconductor manufactures concentrate on making the linear region as predictable as possible, Over tolerances and variations in the device and ambient conditions so that user of the device can accurately control the device in its linear region. A device is usually designed such that it is only possible to use the device in it's linear region, because it is desirable to be able to predict how much power will be delivered for a given power setting For example, in FIG. 2, it is easy to predict the amount of power output which will be provided by the amplifier when the control voltage is in the range 1.7V to 2.2V. When the control voltage is set to a voltage lower than 1.7V, it is not easy to predict the amount of power output which will be provided by the amplifier, for a given control voltage. Small variations in the fabrication of the amplifier, variations in ambient temperature, variations in the antenna connected to the system, and other factors lead to a much greater uncertainty in the amount of output which is to be expected for a given control voltage, when the control voltage is below 1.7V. In this embodiment, the power amplifier has its linear region, and the reader 100 has functionality of operating the power amplifier in the radio 106 in its linear region.

In one example, the switchable external attenuator 108 having a fixed attenuation is enabled and disabled using the digital output 114 from the radio 106. The system sets its power amplifier (e.g., 158 of FIG. 4) to the minimum output power while retaining linear control for the radio 106. The attenuator 108 is enabled to reduce the read range of the RFID reader (effective field of view of the RFID reader) to a greater extent than is possible by setting radio's output power to minimum.

The radio 106 includes a digital controller 140 (e.g., microprocessor) for controlling the functions of the radio 106. The digital controller 140 decodes commands which are sent to the radio 106 by the host 102 via the link 124. The radio 106 is set to it's minimum output power by a command sent by the host 102. In one example, this command may write a value to a register (e.g., 156 of FIG. 4), and this value represents a voltage control of the power amplifier (e.g., 158 of FIG. 4). The one or more digital outputs 114 may be generated by the digital controller 140 based on the commands from the host 102.

The RF signal to/from the radio 106 is connected to the attenuator 108 via the RF connection 116. The RF signal to/from the attenuator 108 is connected to the antenna 110 via the connection 118. The RF connection 116 may be, for example, but not limited to, a coax cable connected between the RF port on the radio 106 and the external attenuator board 108. The connection 118 may be, for example, but not limited to, a coax cable. The external attenuator board 108 has a connector which allows it to be connected to the radio 106 via a flexible circuit (or flex circuit) (i.e., 114, 120). The radio 106 provides power 120 and the control signals 114 to the attenuator board 108 via the flexible circuit. The flexible circuit (or flex circuit) is a flexible printed circuit board, which may be constructed out of polyimide or similar material. The polyimide provides a flexible substrate which is an electrical insulator, copper is deposited on the surface, then etched to create the connections. The flexible circuit 114, 120 may be constructed by other material, and not limited to the above example.

Figure 4:
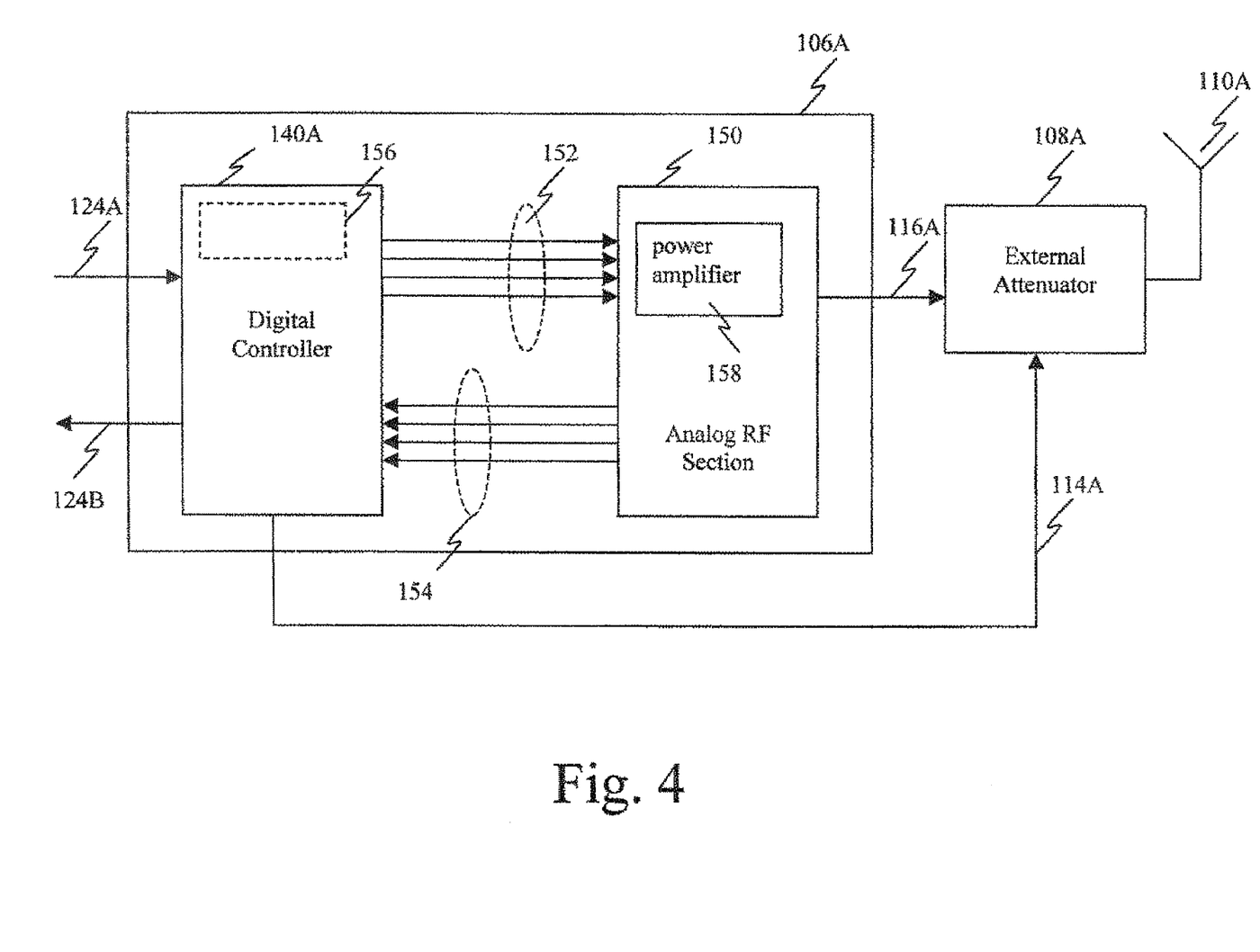
FIG. 4 is a diagram illustrating an example of an attenuator and a radio in the system of FIG. 3.

FIG. 4 illustrates an example of the radio module and the external attenuator of FIG. 3. In FIG. 4, "106A" represents "radio module" and corresponds to "106" of FIG. 3; "108A" represents "external attenuator" and corresponds to "108" of FIG. 3; "110A" represents "antenna" and corresponds to "110" of FIG. 3; "114A" corresponds to "114" of FIG. 3; "116A" corresponds to "116" of FIG. 3; "124A" and "124B" correspond to "124" of FIG. 3; "140A" represents "digital controller" and corresponds to "140" of FIG. 3. The external attenuator 108A is in the IF path 116A between the radio 106A and the antenna 110A. Connection for power supply is not illustrated in FIG. 4.

The radio module 106A includes an analog RF section 150. The analog RF section 150 is coupled with the digital controller 140A. The digital controller 140A decodes one or more digital input signals (124A) from the host (i.e., 102 of FIG. 3) and generates one or more control signals for controlling the analog RF section 150. In FIG. 3, a group of signals 152 represent signals from the digital controller 140A, which includes the control signals generated by the digital controller 140A for controlling the analog RF section 150. The analog RF section 150 generates one or more status signals and modulated data received from tags via the antenna 110A. In FIG. 3, a group of signals 154 represent the status signals and the modulated data. The digital controller 140A interprets the status signals, decodes the modulated data, and sends digital data and status (124B) back to the host. The digital controller 140A also generates one or more digital control signals 114A for controlling the state (or mode) of the external attenuator 108A.

The analog RF section 150 includes a power amplifier 158, which is controlled by the control signals from the digital controller 140A. The digital controller 140A may include a register 156 for holding values relating voltage control of the power amplifier 158.

Referring to FIG. 3, in one example, the RFID reader system 100 may be used for object tracking where RFID tags are attached to containers containing various items and the containers are stacked on top of each other. The RFID tags are arranged with 10 cm between each other. The minimum output power setting of the radio, and hence the read range, which is possible by setting the power amplifier to it's minimum output power, may be greater than the distance between the tags, so that if the handheld RFID reader is held directly in front of one of the tags (the tag of interest), several of the surrounding tags may also be read, as well as the tag of interest. To be able to read only the tag of interest, the attenuator 108 is turned on, such that the minimum output power which can be achieved by only controlling the power amplifier, is further reduced in an accurate fashion to a level at which only the tag of interest is read, and the surrounding tags are not read. As such, by reading the tag of interest, the contents of the particular container which the tag of interest is attached to can be identified, without physically looking inside the container, if the contents of the container had previously been associated with the unique identifier stored on the tag. This is not possible if the tag of interest and other tags are read, because the operator of the handheld RFID reader does not know which unique identifier was read from which tag.

The RFID reader system 100 may have a calibration sequence as described below. The attenuator 108 with a plurality of different attenuation settings is used to calibrate the field of view so that more sensitive tags can still be singulated, and less sensitive tags can still be read. The calibration sequence allows the reader to "Learn" the amount of attenuation required to read a tag at a specific range. Accordingly, a new type of tag with unknown range can be easily introduced into a system employing the RF reader system 100. The reader 100 has a memory (e.g., register 142) for storing calibrated settings for different tags, each of which is selectively executed.

Figure 5:
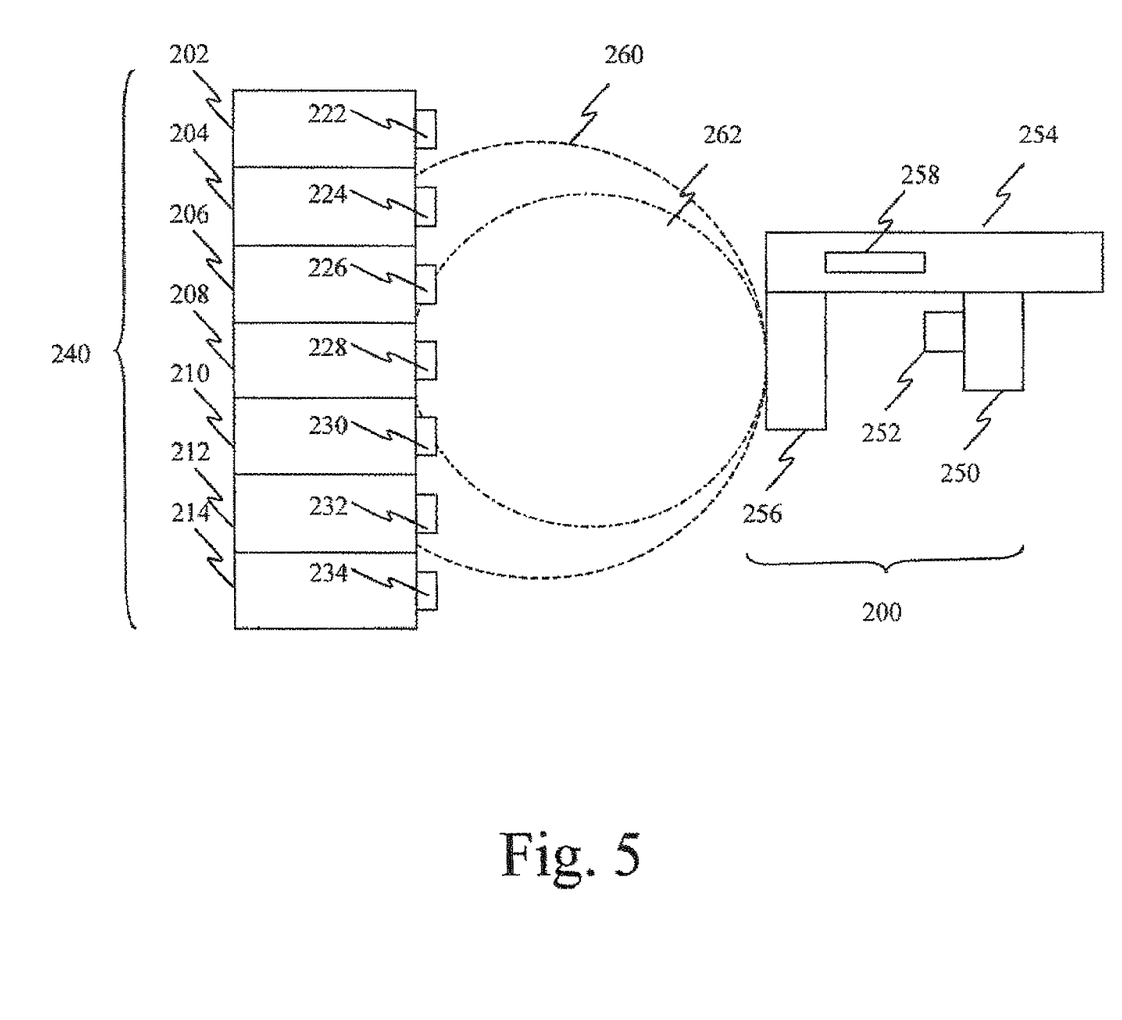
FIG. 5 is diagram illustrating one example of a side view of the system of FIG. 3 and RF fields generated by the system.
Figure 6:
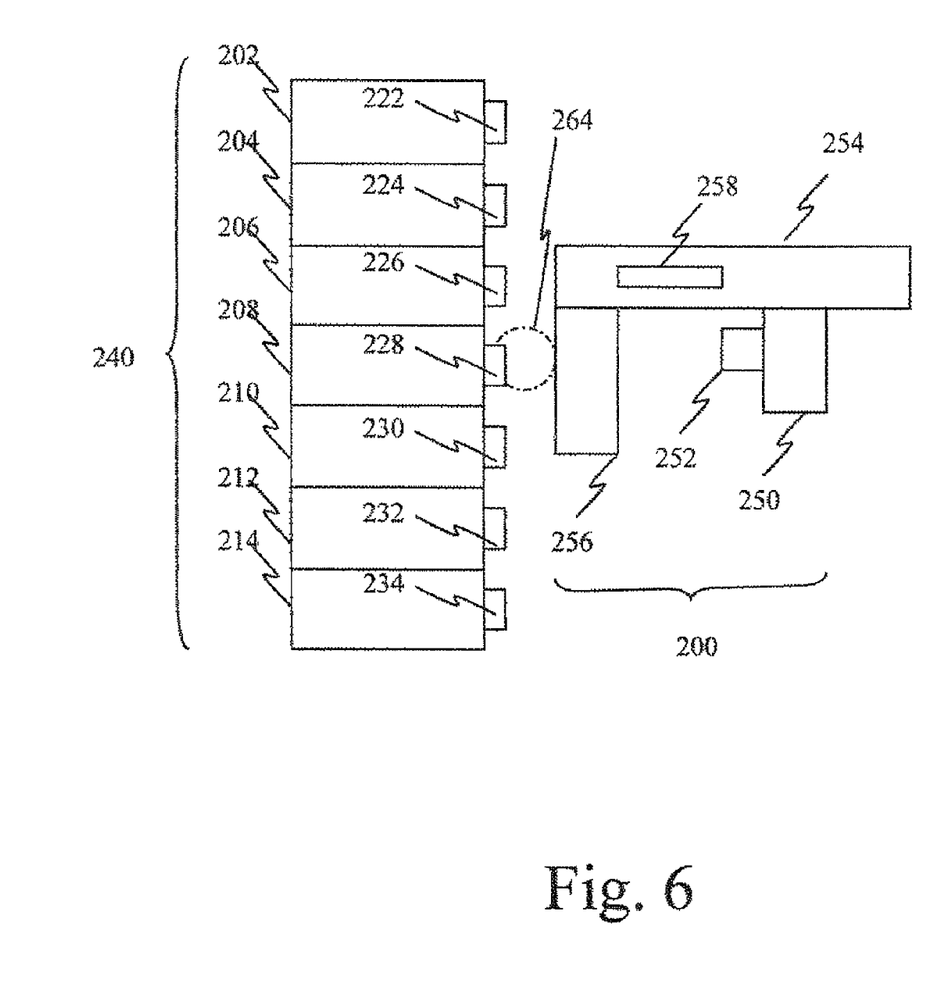
FIG. 6 is a diagram illustrating another example of an RE field generated by the system of FIG. 3.

FIGS. 5-6 illustrate an example of the handheld RFID reader of FIG. 3 and RF fields generated by the reader where a plurality of containers are stacked on top of each other. Each of the containers has a tag attached to the front. In FIGS. 5-6, "200" represents a handheld RFID reader and corresponds to an example of the system 100 of FIG. 3; each of "202", "204", "206", "208", "210", "212", and "214" represents one of the containers, each of "222", "224", "226", "228", "230", "232", and "234" represents the tag attached to the front of the corresponding container, and "240" represents a stack of the containers. Each of "260", "262" and "264" represents the size of the field generated by the reader 200.

The handheld RFID reader 200 includes a pistol grip 250, a trigger 252, a main body 254 and an antenna 256. The antenna 256 corresponds to the antenna 10 of FIG. 4. In FIG. 5 the pistol grip 250, the main body 254 and the antenna 256 are shown separately. However, any of these elements may be integrated. One of ordinary skill in the art will understand that the representation of the pistol grip 250, the trigger 252, the main body 254 and the antenna 256 is schematic only, and the actual configuration of the handheld RFID reader 200 may take on a variety of configurations.

The user of the handheld reader 200 uses one or more user interfaces on the reader 200 to operate the reader 200, e.g., including selecting an operation mode/setting and enabling or disabling the operation mode/setting. One of the user interfaces is the trigger 252. The trigger 252 is generally used to initiate an RFID reading event: The user pulls the trigger 252 and the RFID reader attempts to read tags for as long as the trigger is held down. The trigger 252 may be used for functions other than enabling the read operation. The other user interfaces (e.g., 258) of the reader 200 may include, but not limited to, a display, a touch screen, a control panel, a keyboard, or combinations thereof.

The handheld RFID reader 200 generates an RF field 260 in a first mode. In the first mode, the RF output power is set to maximum. The handheld RFID reader 200 generates another RF field 262 in a second mode. In the second mode, the RF output power is set to minimum and its attenuator's function (e.g., 108 of FIG. 4) is disabled or set to a low level. In the second attenuation mode, the reader 200 still may read three tags 226, 228, and 230.

The handheld REID reader 200 generates an RF field 264 in a third mode where only a single RFID tag is read. In FIG. 6, the handheld RFID reader 200 utilizes its attenuator (e.g., 108 of FIG. 3) to reduce the size of the RF field generated such that only the single RFID tag is read.

Figure 7:
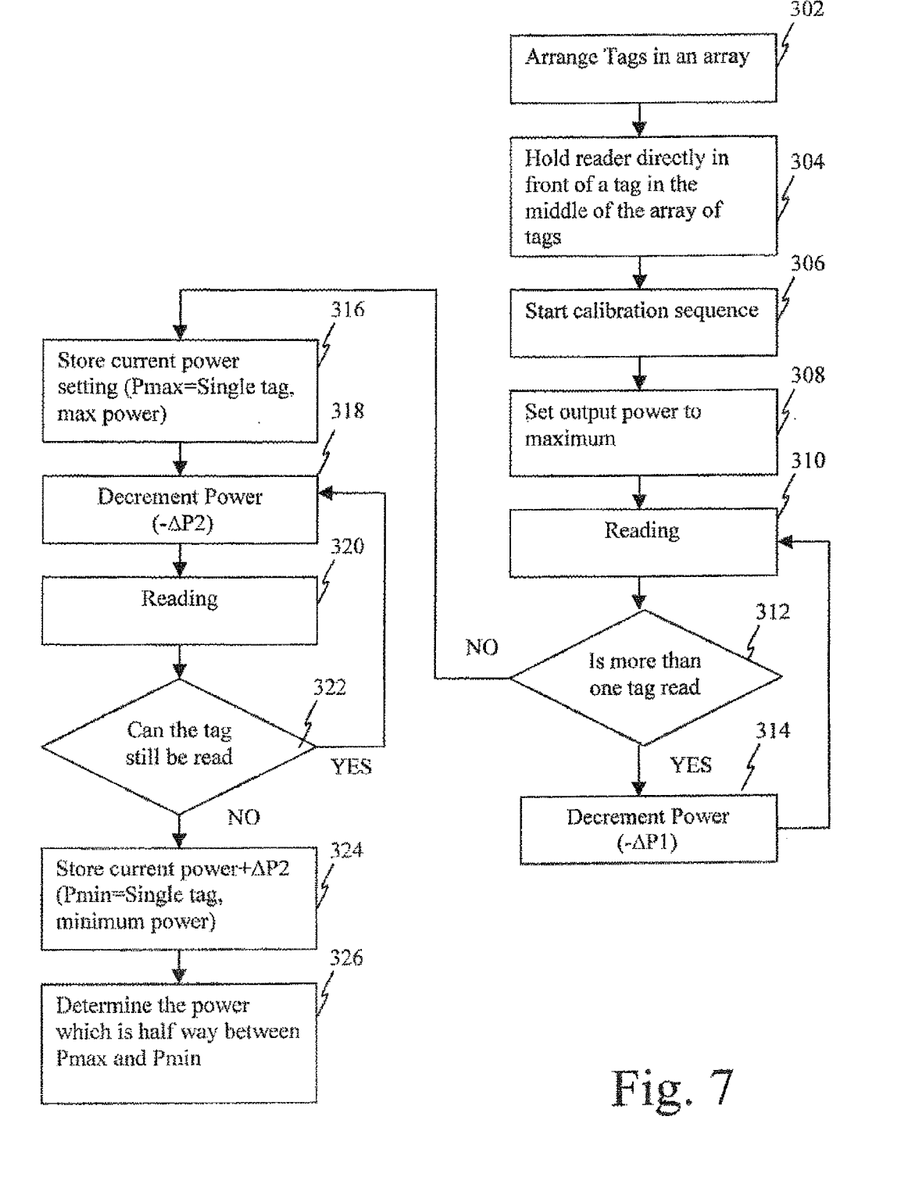
FIG. 7 is a flow chart illustrating an example of a method for calibration, implemented by the system of FIG. 3.

The handheld RFID reader 200 includes a module for calibrating the output power of the reader 200, e.g., the calibration sequence of FIG. 7. The reader 200 in FIG. 6 may use the calculated power obtained by the calibration sequence to generate the RF field 264.

A user of RFID technology may use tags which are all of the same type throughout their system. These tags may have a very similar read range when the reader is set to a specific output power. The calibration sequence calibrates the power setting, the attenuation level or a combination thereof for one type of tag. If the user decides to change the type of tags used in their system to a different type, because the new type is cheaper, or has better performance or features, etc, then the reader 200 will be calibrated to the new tags, so that a single tag can still be read, when it is surrounded by other tags. The reader 200 can store calibration settings for different tags. The users of the reader 200 can select, through the user interface, the setting required for the tag they are trying to read. The operator can also manually adjust the attenuation level after the calibration process, but can also retrieve the calibrated setting as required.

Referring to FIGS. 5-6, a touch screen on the display (eg., 258) provides the amount of control of the output power. The RF Field is controlled by using the touch screen on the display, for example, to alter a setting in a control panel or selecting an option in a program. The control panel is a collection of applications where each of the applications controls how certain features of one of the pieces of hardware (or software) present on the handheld terminal functions. For example, there may be an application in the control panel which controls some functions of the RFID reader 200, this application may allow the user to specify, amongst other things, which protocol tags will be read when the RFID reader 200 is enabled, or control the amount of its output power. In another example, the RF power/the attenuation level may be set by user interfaces other than the touch screen. Setting the RF output power and setting the attenuation level may be implemented separately, or may appear to be a single continuous control of the read range of the handheld REID reader 200 to the user, where the attenuator is used to reduce the range further than that may normally be possible by relying only on the control available by using the power amplifier.

FIG. 7 is a flow chart illustrating a method for calibration sequence, applicable to the systems of FIGS. 3-6. It is assumed that tags are arranged in an array (step 302), so that the tags are spaced at a separation. This assumption may be expected under normal use conditions.

The RFID reader (i.e., 100 of FIG. 3, 200 of FIGS. 5-6) is held directly in front of one of the tags (step 304). When the calibration sequence is started (step 306), the RFID reader starts off at maximum power (step 308). Then the RFID reader performs the tag read operation (step 310). The REID reader determines whether more than one tag is read (step 312). The REID reader may count the unique tags at step 312.

When the RFID reader detects more than one tag is read, the RFID reader reduces the RF output power ("P") in a small increment (step 314) ("P"→"P"-ΔP1). It goes to step 310, until only one single tag of interest can be read.

When only one tag is read, the RFID reader stores its current power setting "P" as Pmax ("single tag, max power") (step 316). The RFID reader reduces the RF output power (step 318) ("P"→"P"-ΔP2). ΔP2 may be identical to ΔP1. Then the RFID reader performs the tag read operation (step 320). The RFID reader determines whether any tag sill can be read (step 322). The operations of step 318-322 are-repeated until no tags can be read. When the REID reader determines that no tag can be read, the RFID reader stores its current power setting (P+ΔP2) as Pmin ("single tag, min power") (step 324). The reader may determine the power "Px" which is halfway between Pmax and Pmin and stores in the memory (step 326)

The upper and lower output powers, Pmin and Pmax, which allow only a single tag to be read, are then known. If an output power setting is used, which is between these two values (e.g., "Px"), when a single tag is to be read, this will provide some tolerance so that the system is robust: tag variation, contents of the containers, interference, etc will be less likely to cause the system to fail.

In FIG. 7, the number of the decrement operation (steps 314, 318) may be stored in a memory of the RFID reader. The power before the operation of the step of 318 and the power after the operation of the step of 318 may be stored in the memory. The memory may be in the host (102 of FIG. 4) or the digital controller (140 of FIG. 4) in the radio module (106 of FIG. 4).

The flowchart of FIG. 7 treats the output power, and hence read range of the reader as a single continuous spectrum of output powers, whether the attenuator (e.g., 108 of FIG. 3, 108A of FIG. 4) is used or not. For example, the output power may be controlled in the range of 30 dBm down to 10 dBm in 1 dB increments by controlling the power amplifier (e.g., 158 of FIG. 4) only. 10 dBm may be the lowest power which it may normally be possible to set the output power to, when just using the power amplifier to control the output power. The attenuator is used to extend this range of output powers down to 0 dBm, so the entire range of output powers is now from 0 dBm to 30 dBm, in 1 dB increments. In FIG. 7, the output power may be set to 30 dBm in step 308, and is reduced in 1 dB increments in step 314.

Figure 8:
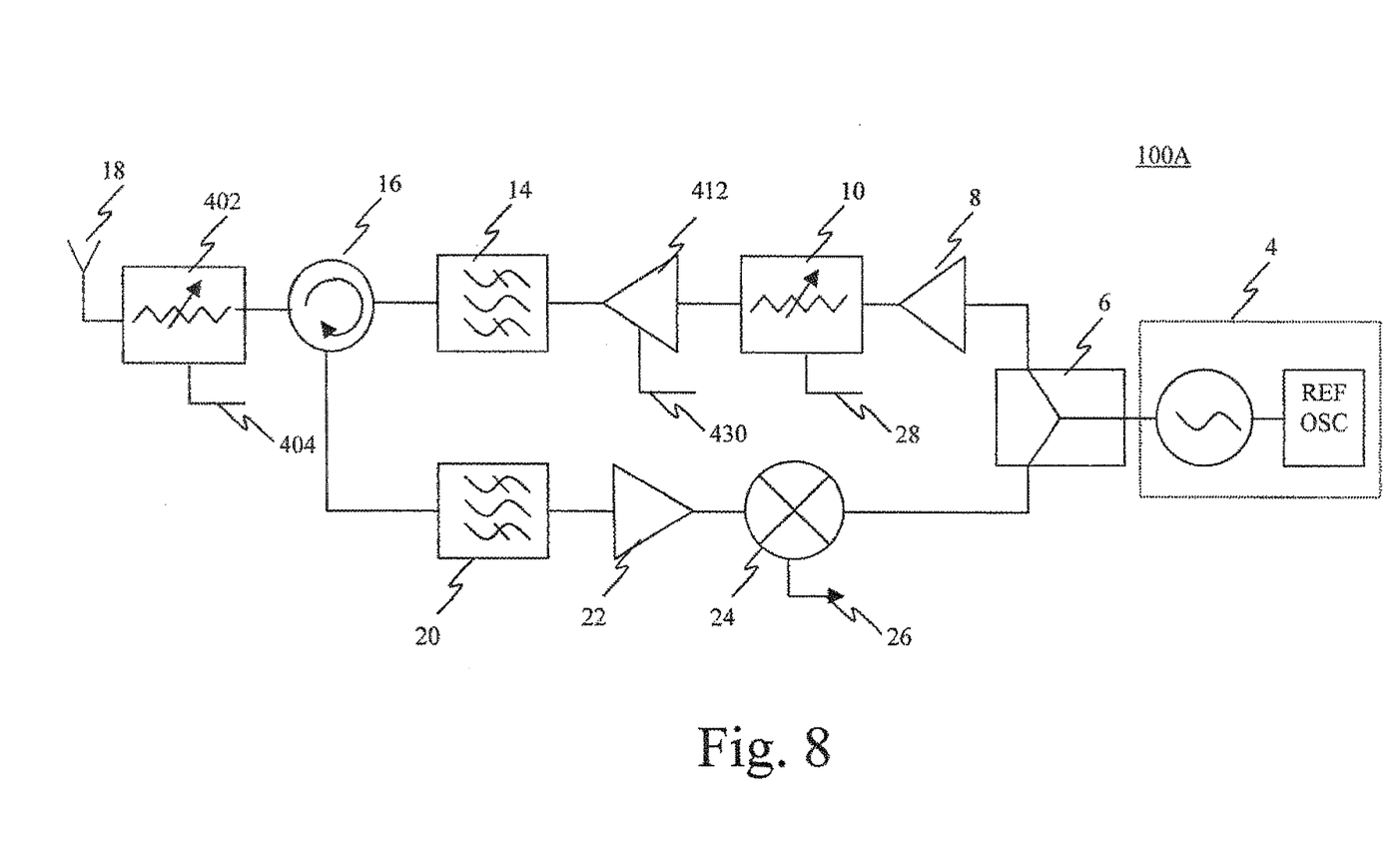
FIG. 8 is a diagram illustrating an example of an RF architecture applicable to the system of FIG. 3.

FIG. 8 illustrates an example of an RF architecture for the RFID reader system 100 of FIG. 3. In FIG. 8, "402" represents "RF attenuator" and corresponds to the attenuator 108 of FIG. 3; "404" represents "attenuator control signal(s)" and corresponds to 114 of FIG. 3. The RF architecture 100A of FIG. 8 is similar to the RF architecture of FIG. 1. The RF architecture 100A further includes the RF attenuator 402.

In FIG. 8, "412" represents a power amplifier and may be same or similar to the power amplifier 12 of FIG. 1, and "430" represents a control for the power amplifier 412 and may be same or similar to the power amplifier control 30 of FIG. 1.

The RF attenuator 402 is positioned after the final/first stage of the RF transmit/receive portion of the RF reader so that the power amplifier can be used to control the output power down to a level which is within it's linear region, and the attenuator can be used to reduce the output power further than would normally be possible, while retaining accurate control of the output power. As described above, the amplifier 412 is used in its linear region if predictable control is required. In FIG. 8, the attenuator 402 is positioned between the circulator 16 and the antenna 18. This provides precise control of the output power of the final stage of the RF reader and simplifies the design and calibration of the RF portion of the RFID reader, rather than controlling the power amplifier itself to limit the amount of RF power radiated.

The elements of FIG. 8 other than the attenuator 402 correspond to the internal elements of the RF section of radio 106A of FIG. 4. The radio interface of FIG. 3 is not shown in FIG. 8. The handheld terminal 102 of FIG. 3 may control the RF architecture 100A through the lines 26, 28 and 30 indirectly. The digital controller 104 of FIG. 3 may directly control the RF architecture 100A.

The attenuator 402 is controlled with one or more than one attenuator control signal 404. The one or more than one attenuator control signal 404 is capable of controlling the operation mode of the attenuator 402. In one example, the operation mode includes a first mode and a second mode. In the first mode, there is no attenuation of an input signal. In the second mode, the attenuator 402 performs a range of defined attenuations depending on the state of the one or more than one attenuator control signal 404.

The attenuator control signal 404 is generated, for example, by a controller (e.g., digital controller 140 of FIG. 3, 140A of FIG. 4) in response to a command sent by the host (e.g., 120 of FIG. 3). Noise from the host will be filtered out by the digital controller, and thus it is possible to implement accurate operation. However, the attenuator control signal 404 may be generated by the host directly in an alternative embodiment.

By using the attenuator 402, the power amplifier 412 is controlled in its linear region, providing RFID read range control down to a well defined minimum level, after which the level of attenuation of this minimum level can be controlled by setting the attenuator 402 to a specified level of attenuation using the one or more than one attenuator control signal 404. This provides a short and well defined read range.

The attenuator 108 of FIG. 3 and the attenuator 402 Of FIG. 8 may include, but not limited to, a Pi Attenuator, Tee attenuator, Bridged T attenuator, or a combination of several attenuator elements in series to provide different levels of attenuation.

Figure 9:
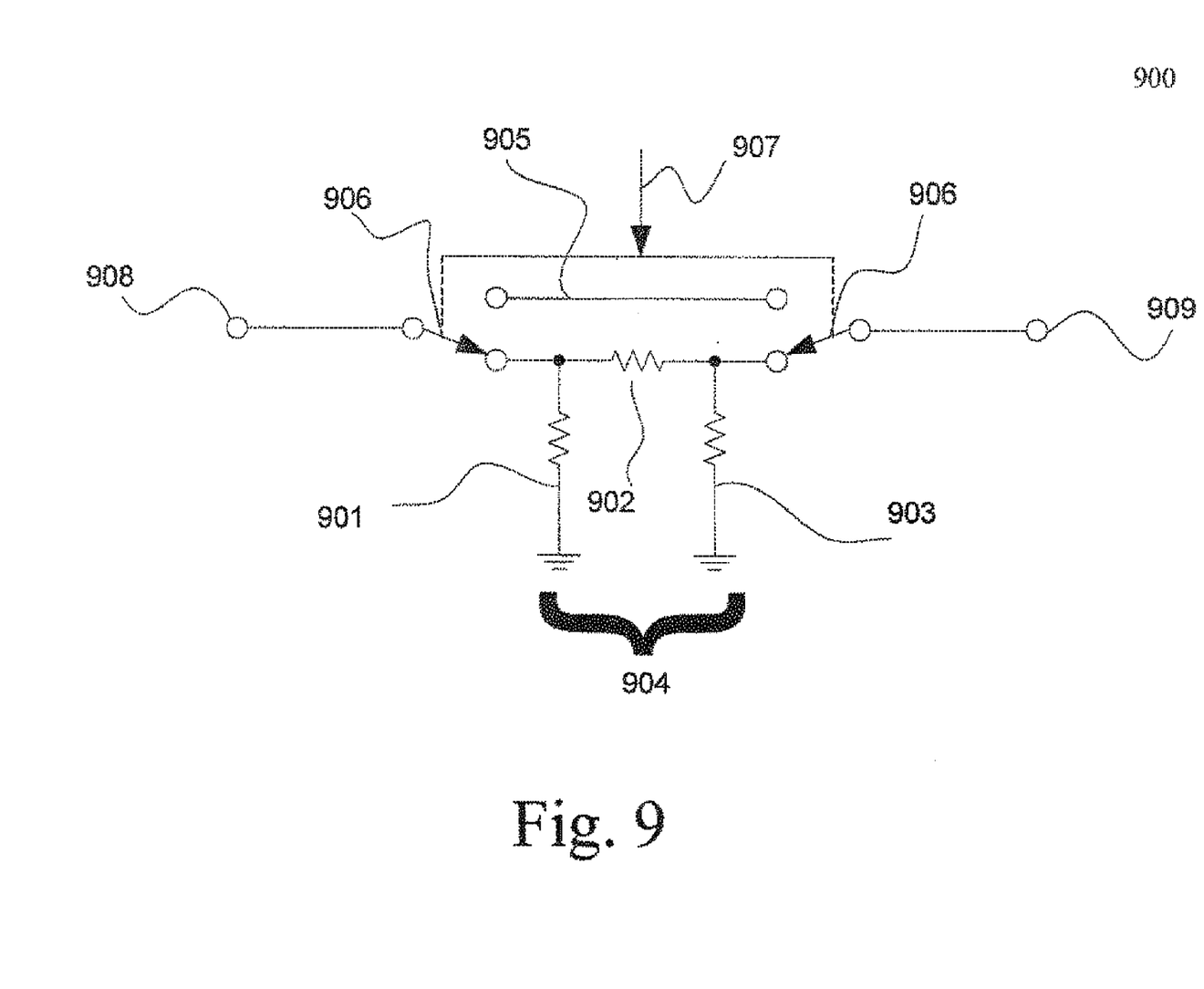
FIG. 9 is a diagram illustrating an example of the attenuator employed in the systems of FIGS. 3 and 8.

FIG. 9 illustrates a schematic representation of a switchable Pi attenuator applicable to the systems of FIGS. 3 and 8. Resistors 901, 902 and 903 make up the Pi attenuator 904. Control signal 907 (e.g., 114 of FIG. 3) controls a switch 906, which directs the RF signal through the attenuator 904 when enabled, and through the short circuit 905 when the attenuator is disabled. The RF signal enters the circuit at an input node (line) 908, and leaves the circuit through an output node (line) 909.

Figure 10:
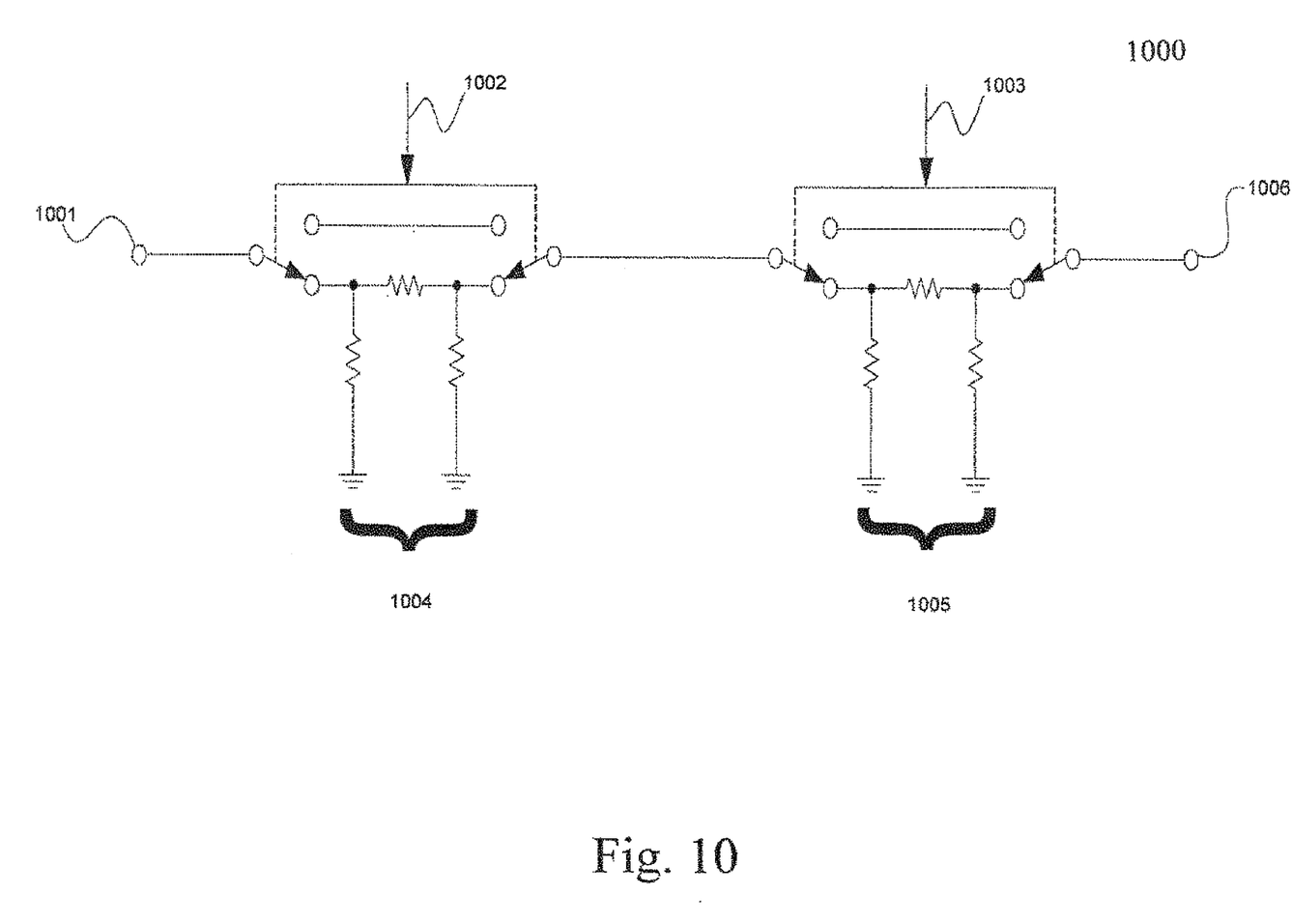
FIG. 10 is a diagram illustrating another example of the attenuator employed in the systems of FIGS. 3 and 8.

Several attenuator elements as shown in FIG. 9 can be connected in series to provide different levels of attenuation. For example, two Pi attenuators may be connected in series as shown in FIG. 10. In FIG. 10, Pi attenuators 1004 and 1005 in an attenuator unit 1000 are connected in series where the attenuator 1004 provides, for example, 3 dB of attenuation, and the attenuator 1005 provides, for example, 6 dB of attenuation. The attenuators 1004 and 1005 are controlled by control signals 1002 and 1003, respectively. When the control signals 1002 and 1003 are used to enable attenuators 1004 and 1005 respectively, the circuit can provide 0 dB, 3 dB, 6 dB or 9 dB of attenuation, depending on the state of the control signals. The RF signal enters the circuit at an input node (line)1001 and leaves at an output node (line) 1006.

In another example, the attenuator may be a voltage variable attenuator. In this case, the system 100 of FIG. 3 includes mechanism for providing an analog output from either the radio 106 of FIG. 3 or the radio interface 104 of FIG. 3 as a means to control the attenuator 108 of FIG. 3.

The above embodiments and their examples provide low and accurate controlled read range (output power control) of the handheld RFID reader (e.g., 100 of FIG. 3, 200 of FIG. 5, 100A of FIG. 8). The read range of the RFID reader is reduced such that an individual RFID tag can be read, when it is surrounded by other RFID tags. This read range control allows for virtually "contact" reading of the tag of interest so that only the tag directly in front of the antenna is read. This read range control is achieved without using costly power amplifiers which retain a linear response even at low levels of output power, or without time consuming calibration of a non linear region of an inexpensive power amplifier. This read range control provides the user of the handheld RFID reader with the benefits of RFID readers that scan multiple items more or less simultaneously.

The read range control in accordance with the above embodiments and their examples also provides the user of the handheld RFID reader with the benefits of traditional laser barcode scanners that scan individual items. In traditional barcode laser barcode scanning, a laser beam is generated, and directed at a mirror or prism which is moved such that the laser beam is scanned backwards and forwards across a barcode. A photodiode is used to measure the intensity of the laser beam which is reflected back from the barcode, so that the bands of black and white which encode the information represented by the barcode can be decoded. A system employing a laser barcode scanner has to be positioned directly in front of the barcode so that the laser beam hits the single barcode. Only a single item can be scanned at a time, unlike an RFID system which can identify multiple items more or less simultaneously when used at high power. If the barcode is obstructed, it can not be scanned at all, while an RFID system can read an obstructed tag as long as the RF signal can reach the tag.

One or more currently preferred embodiments have been described by way of example. It will be apparent to persons skilled in the art that a number of variations and modifications can be made without departing from the scope of the invention as defined in the claims.

What is claimed is:

1. A system for power control for Radio Frequency Identification (RFID) tag reading, comprising:
    a power amplifier for providing an RF transmit signal for the RFID tag reading;
    an attenuator for attenuating the RF transmit signal output from the power amplifier, an attenuated transmit signal from the attenuator being provided to an antenna; and
    a controller for controlling each of the power amplifier and the attenuator, the controller operating the power amplifier within a linear operation region of the power amplifier, independent of the operation of the attenuator,
    the attenuator being capable of reducing a field of view for the RFID tag reading to a greater extent than is possible by setting the power of the power amplifier to a minimum level in the linear operation region.

2. A system as claimed in claim 1, wherein the controller comprises:
    a calibration module for calibrating at least one of a power setting of the power amplifier, an attenuation level of the attenuator or a combination thereof to singulate an RFID tag of interest among a plurality of RFID tags.

3. A system as claimed in claim 2, further comprising a memory for storing one or more calibrated settings for at least one of the power amplifier and the attenuator, which is obtained by the calibration module, each of the at least one of the calibrated settings being selectively enabled.

4. A system as claimed in claim 2, wherein one or more calibrated settings comprise:
    a maximum power setting for singulating the RFID tag of interest, and
    a minimum power setting that is obtained by further reducing the field of view for the RFID to reading after the RFID to of interest is singulated, until no tag is readable.

5. A system as claimed in claim 1, wherein the system comprises:
    a radio module including:
        an RF section having the power amplifier; and the controller,
        the controller being for communicating with a host and communicating with the RF section.

6. A system as claimed in claim 5, wherein the controller communicates with the host through a bi-directional link and decodes a command from the host.

7. A system as claimed in claim 6, wherein a voltage control of the power amplifier is written into a register based on the command from the host.

8. A system as claimed in claim 5, wherein the controller generates a control signal for controlling the attenuator.

9. A system as claimed in claim 5, wherein the attenuator is powered by the radio module or the host.

10. A system as claimed in claim 5, further comprising:
    a radio interface for operably connecting the radio module and the host.

11. A system as claimed in claim 5, wherein the host is a handheld host terminal for the RFID tag reading.

12. A system as claimed in claim 5, wherein the RF transmit signal is connected between the radio module and the attenuator with an RF connection having a coax cable.

13. A system as claimed in claim 5, wherein the radio module provides at least one of power and a control signal to the attenuator via a flexible circuit.

14. A system as claimed in claim 5, wherein the system comprises:
    a transmit path including the power amplifier and the attenuator; and
    a receive path for receiving a response from one or more RFID tags.

15. A system as claimed in claim 1, wherein a host controls an output level of the power amplifier.

16. A system as claimed in claim 1, further comprising:
    a host for controlling the power amplifier, the attenuator or a combination thereof for the RFID tag reading.

17. A handheld device comprising:
    an RFID reader including an analog RF section having a power amplifier for providing an RF transmit signal for the RFID tag reading;
    an antenna; and
    an external attenuator, for attenuating the RF transmit signal output from the power amplifier, connected to the analog RF section and the antenna,
    the RF reader including a controller for controlling the power amplifier and the attenuator, the controller operating the power amplifier in a linear operation region of the power amplifier, independent of the operation of the attenuator, the attenuator being capable of reducing a field of view for the RFID reader to a greater extent than is possible by setting the power of the power amplifier to a minimum level in the linear operation region.

18. A handheld device as claimed in claim 17, wherein the host comprises:
    a user interface for operating the reader for the RFID tag reading.

19. A handheld device as claimed in claim 17, wherein the host comprises:
a module for calibrating the power of the radiated transmit signal to read a single RFID tag.

20. A method for power control for Radio Frequency Identification (RFID) tag reading, comprising:
setting a field of view of a handheld reader, the handheld reader including a power amplifier for providing an RF transmit signal for the RFID tag reading, and an attenuator for attenuating the RF transmit signal output from the power amplifier, an attenuated transmit signal from the attenuator being provided to an antenna;
controlling the power amplifier, including:
operating the power amplifier in a linear operation region of the power amplifier, independent of the operation of the attenuator; and
controlling an attenuation level of the attenuator, including:
enabling the attenuator to reduce a field of view for the RFID rag reading to a greater extent than is possible by setting the power of the power amplifier to a minimum level in the linear operation region.

21. A method as claimed in claim 20, comprising:
determining whether a RFID tag of interest is readable among a plurality of RFID tags.

22. A method as claimed in claim 20, comprising:
selectively retrieving a setting for at least one of the power amplifier and the attenuator to singualte an RFID to of interest.

23. A method as claimed in claim 20, wherein the step of setting comprises:
initially setting a power of the power amplifier to the maximum level in the linear operation region, and
the step of controlling the power amplifier, comprising:
decreasing the power of the power amplifier within the linear operation region.

24. A method as claimed in claim 20, the steps of controlling determines:
a first setting for the power amplifier and the attenuator at which the RFID tag of interest is singulated; and
a second setting for the power amplifier and the attenuator at which no tag is readable, the second setting being obtained by reducing the field of view after the RFID tag of interest is singulated.

* * * * *

UNITED STATES PATENT AND TRADEMARK OFFICE
CERTIFICATE OF CORRECTION

PATENT NO. : 8,159,331 B2  
APPLICATION NO. : 11/779129  
DATED : April 17, 2012  
INVENTOR(S) : Stagg Page 1 of 2

It is certified that error appears in the above-identified patent and that said Letters Patent is hereby corrected as shown below:

On the Title Page, in Item (73), under "Assignee", in Column 1, Line 1, delete "Inc. (CA)" and insert -- Inc., Mississauga (CA) --, therefor.

In the Specifications

In Column 1, Lines 38-39, delete "1 2," and insert -- 12, --, therefor.

In Column 2, Line 44, delete "REID" and insert -- RFID --, therefor at each occurrence throughout the specification.

In Column 2, Line 44, delete "reading" and insert -- reading. --, therefor.

In Column 3, Line 17, delete "RE" and insert -- RF --, therefor.

In Column 4, Line 16, delete "it's" and insert -- its --, therefor.

In Column 4, Line 64, delete "TX," and insert -- TX; --, therefor.

In Column 4, Line 64, delete "speed)," and insert -- speed); --, therefor.

In Column 5, Line 15, delete ""off"" and insert -- "off", --, therefor.

In Column 5, Line 37, delete "Over" and insert -- over --, therefor.

In Column 5, Line 41, delete "it's" and insert -- its --, therefor.

In Column 5, Line 43, delete "setting" and insert -- setting. --, therefor.

In Column 6, Line 38, delete "IF" and insert -- RF --, therefor.

Signed and Sealed this  
Twenty-third Day of April, 2013

Teresa Stanek Rea  
*Acting Director of the United States Patent and Trademark Office*

CERTIFICATE OF CORRECTION (continued)
U.S. Pat. No. 8,159,331 B2

In Column 7, Line 3, delete "it's" and insert -- its --, therefor.

In Column 7, Line 48, delete "10" and insert -- 110 --, therefor.

In Column 7, Line 49, delete "5" and insert -- 5, --, therefor.

In Column 8, Line 35, delete "(eg.," and insert -- (e.g., --, therefor.

In Column 9, Line 17, delete "326)" and insert -- 326). --, therefor.

In Column 9, Line 60, delete "it's" and insert -- its --, therefor.

In Column 10, Line 35, delete "Of" and insert -- of --, therefor.

In Column 10, Line 62, delete "(line)1001" and insert -- (line) 1001 --, therefor.

In the Claims

In Column 12, Line 2, in Claim 4, delete "comprise:" and insert -- comprises: --, therefor.

In Column 12, Lines 6-7, in Claim 4, delete "RFID to reading after the RFID to" and insert -- RFID tag reading after the RFID tag --, therefor.

In Column 13, Line 19, in Claim 20, delete "rag" and insert -- tag --, therefor.

In Column 14, Line 3, in Claim 22, delete "RFID to" and insert -- RFID tag --, therefor.